UNITED STATES PATENT OFFICE.

MARIO ROSSI, OF CERVIGNANO, AUSTRIA-HUNGARY.

SIZING COMPOSITION.

937,095.  Specification of Letters Patent.  Patented Oct. 19, 1909.

No Drawing.  Application filed April 22, 1909. Serial No. 491,536.

*To all whom it may concern:*

Be it known that I, MARIO ROSSI, a subject of the King of Italy, residing at Cervignano, Austria-Hungary, have invented certain new and useful Improvements in Sizing Compositions, of which the following is a specification.

The present invention relates to the production of a sizing composition for textile fabrics and more particularly to a finish for linen and other fabrics, especially adapted for household use.

It is well known that textile fabrics which have been washed and have thereby become limp and of bad appearance may be made to appear attractive and be agreeable to the touch by being subjected to heat and pressure in a calender. Owing to the complicated nature of such apparatus, it is impracticable for use for household purposes. Starch with or without the addition of fatty matters has been used as a substitute for the treatment with hot calenders, but such materials do not give satisfactory results, because ordinary starch gives the fabric too much of a board-like stiffness, and the fatty matters being insoluble in water prevent the fabric receiving any gloss or finish.

The object of the present invention is the production of a size or finish for cloth which will avoid all of the disadvantages mentioned, and which will at the same time impart an attractive appearance and pleasant touch to the textile articles to which it is applied.

According to my invention, I subject wet starch (starch which has been suspended in water) to the action of gaseous sulfur dioxid, for a period varying from 10 to 15 hours. By this treatment the starch is transformed, in a very specific manner, into a product something between starch and dextrin, and the adhesiveness of the starch is diminished. I then mix together about 100 parts of the thus treated starch, and about 30 parts of a soap-like compound of ammonia with unsaturated fatty acids, preferably oleic acid, and the resultant product is dried for use. The said product is capable as a substitute for hot calendering.

Having thus described my invention, what I claim is:—

1. The herein described sizing composition, comprising the product resulting from the action of sulfur dioxid on starch, and a soap-like material, substantially as described.

2. The herein described sizing composition, comprising the product resulting from the action of sulfur dioxid on starch, and an ammonia soap, substantially as described.

3. The herein described sizing composition, consisting of a starch-like material intermediate starch and dextrin in constitution, and a soap-like compound of ammonia and a fatty acid, substantially as described.

4. The herein described sizing composition, comprising the product resulting from the action of sulfur dioxid on wet starch for from 10 to 15 hours the said product being intermediate starch and dextrin in constitution, and a soap-like compound of ammonia and an unsaturated fatty acid, substantially as described.

5. The herein described sizing composition for textile fabrics, consisting of about 100 parts of the product resulting from the action of sulfur dioxid on wet starch, and about 30 parts of a soap-like compound of ammonia and an unsaturated fatty acid, substantially as described.

6. The herein described sizing composition for textile fabrics, consisting of 100 parts of a starch-like material intermediate starch and dextrin in constitution the said material resulting from the action of gaseous sulfur dioxid on wet starch, and 30 parts of a compound of ammonia and oleic acid, substantially as described.

In testimony whereof I affix my signature in presence of two witnesses.

MARIO ROSSI.

Witnesses:
 GIUSTO CASSUTTOY,
 GIUSEPPE COSTALBERK.